US010564881B2

United States Patent
Zhou et al.

(10) Patent No.: US 10,564,881 B2
(45) Date of Patent: Feb. 18, 2020

(54) DATA MANAGEMENT IN A MULTITIER STORAGE SYSTEM

(71) Applicant: INTERNATIONAL BUSINESS MACHINES CORPORATION, Armonk, NY (US)

(72) Inventors: Xue Qiang Zhou, Shanghai (CN); Duo Chen, Shanghai (CN); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/994,839

(22) Filed: May 31, 2018

(65) Prior Publication Data

US 2019/0369897 A1 Dec. 5, 2019

(51) Int. Cl.
G06F 12/00 (2006.01)
G06F 3/06 (2006.01)
H04L 29/08 (2006.01)

(52) U.S. Cl.
CPC .......... *G06F 3/0644* (2013.01); *G06F 3/0608* (2013.01); *G06F 3/0679* (2013.01); *G06F 3/0685* (2013.01); *H04L 67/1097* (2013.01)

(58) Field of Classification Search
CPC .... G06F 3/0644; G06F 3/0608; G06F 3/0679; G06F 3/0685; H04L 67/1097
See application file for complete search history.

(56) References Cited

U.S. PATENT DOCUMENTS

| | | |
|---|---|---|
| 8,239,584 B1 | 8/2012 | Rabe et al. |
| 8,566,546 B1 | 10/2013 | Marshak et al. |
| 8,935,493 B1 | 1/2015 | Dolan et al. |
| 9,026,765 B1 | 5/2015 | Marshak et al. |
| 9,354,813 B1 | 5/2016 | Dolan et al. |
| 9,372,630 B2 * | 6/2016 | Guo ............... G06F 3/0619 |
| 9,715,353 B2 | 7/2017 | Erdmann et al. |

(Continued)

FOREIGN PATENT DOCUMENTS

JP 2006099748 A 4/2006

OTHER PUBLICATIONS

Tai et al., "Live Data Migration for Reducing SLA Violations in Multi-Tiered Storage Systems", 2014 IEEE International Conference of Cloud Engineering, pp. 361-366.

(Continued)

*Primary Examiner* — Prasith Thammavong
(74) *Attorney, Agent, or Firm* — Teddi E. Maranzano

(57) ABSTRACT

Embodiments of the present disclosure relate to data management in a multitier storage system (MSS), the MSS comprises a storage virtualization controller (SVC) having at least one storage pool, and the storage pool comprises at least one logic volume, and the at least one logic volume comprises at least one tier. In response to the completion of a data migration from a source physical space of a first tier to a destination physical space of a second tier in a logic volume of a first storage pool, it is determined there is a free physical space in the source physical space. In response to the result of the determination indicating there exists a free physical space and the source physical space being thin provisioned, the free physical space of the source physical space is released to the storage array by the SVC.

18 Claims, 7 Drawing Sheets

(56) References Cited

U.S. PATENT DOCUMENTS

| | | |
|---|---|---|
| 2006/0069862 A1 | 3/2006 | Kano |
| 2007/0233868 A1 | 10/2007 | Tyrrell et al. |
| 2010/0082765 A1* | 4/2010 | Murase ................. G06F 3/0608 709/213 |
| 2010/0199036 A1 | 8/2010 | Siewert et al. |
| 2011/0066802 A1* | 3/2011 | Kawaguchi ........... G06F 3/0605 711/114 |
| 2012/0047346 A1 | 2/2012 | Kawaguchi |
| 2013/0275694 A1* | 10/2013 | Gao .......................... G06F 5/06 711/162 |
| 2014/0068211 A1* | 3/2014 | Fiske .................. G06F 11/1456 711/162 |
| 2014/0258670 A1* | 9/2014 | Venkatasubramanian ................... G06F 12/023 711/171 |
| 2016/0124773 A1* | 5/2016 | Gaurav ..................... G06F 9/50 718/104 |
| 2016/0320980 A1* | 11/2016 | Fang ..................... G06F 3/0611 |
| 2017/0285972 A1 | 10/2017 | Dalmatov |

OTHER PUBLICATIONS

Mell et al., "The NIST Definition of Cloud Computing", National Institute of Standards and Technology, Special Publication 800-145, Sep. 2011, pp. 1-7.

\* cited by examiner

DATA MANAGEMENT IN A MULTITIER STORAGE SYSTEM

BACKGROUND

The present disclosure relates to data management, and more specifically, to data management in a multitier storage system (MSS).

A MSS is a storage system which is composed of multiple types (tiers) of storage devices and/or subsystems, each having distinct characteristics from other tiers. Typical technologies used for an individual storage tier include flash memory, magnetic disks, and tapes. The MSS is usually designed to meet system requirements that any single tier would not be able to meet alone. To ease the management, the MSS often has the capability of automatically and dynamically moving data across tiers in accordance with the requirements.

SUMMARY

According to one embodiment of the present invention, there is provided a method, system, and computer program product for data management in a multitier storage system (MSS), the MSS comprising a storage virtualization controller (SVC) having at least one storage pool, the at least one storage pool comprising at least one logic volume, the at least one logic volume comprising at least one tier. The SVC determines whether there is a free physical space in a source physical space in response to a completion of a data migration from the source physical space of a first tier to a destination physical space of a second tier in a logic volume of a first storage pool. The SVC releases the free physical space of the source physical space from the first storage pool in response to a result of a determination indicating the free physical space and the source physical space are thin provisioned.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
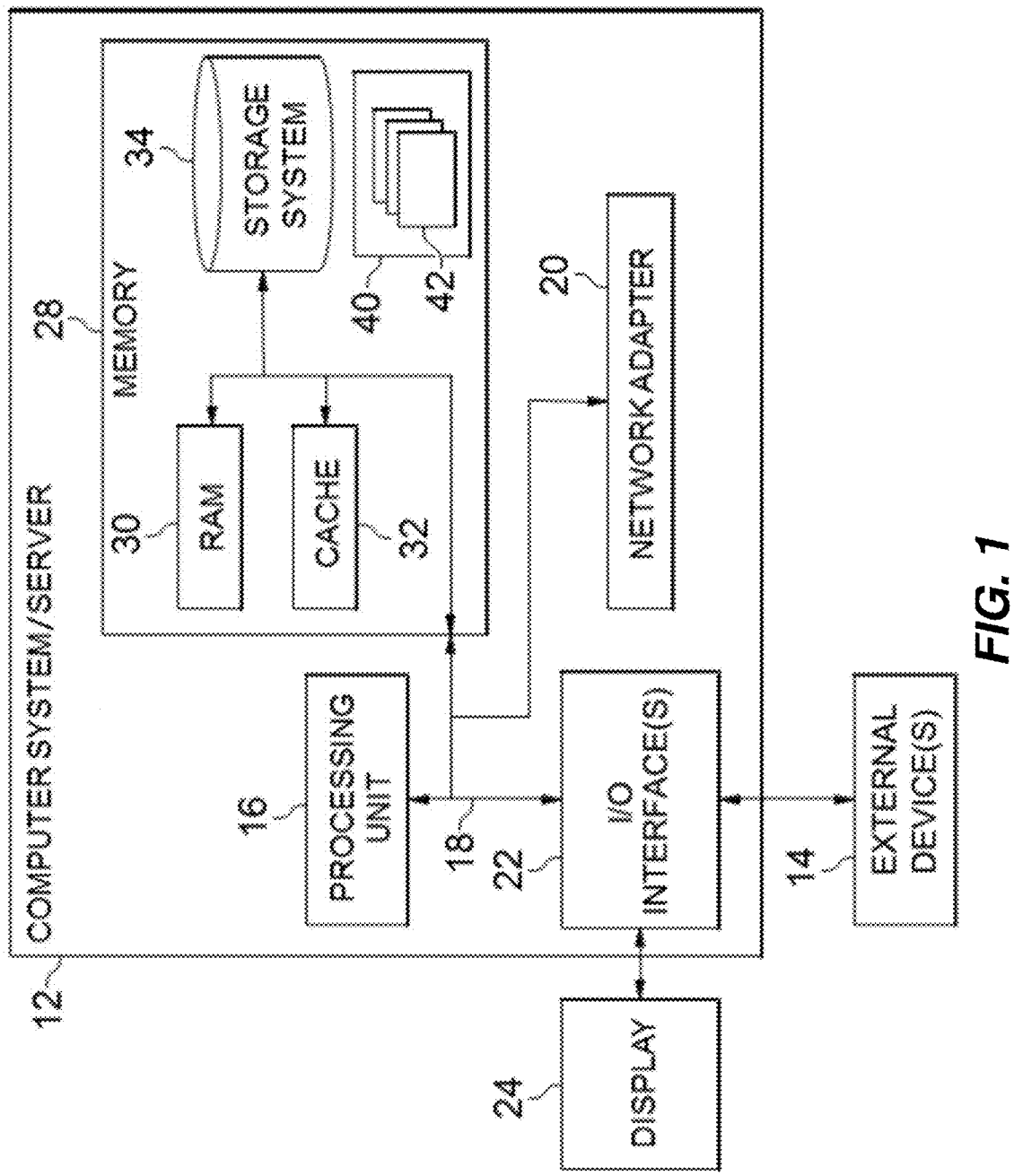
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
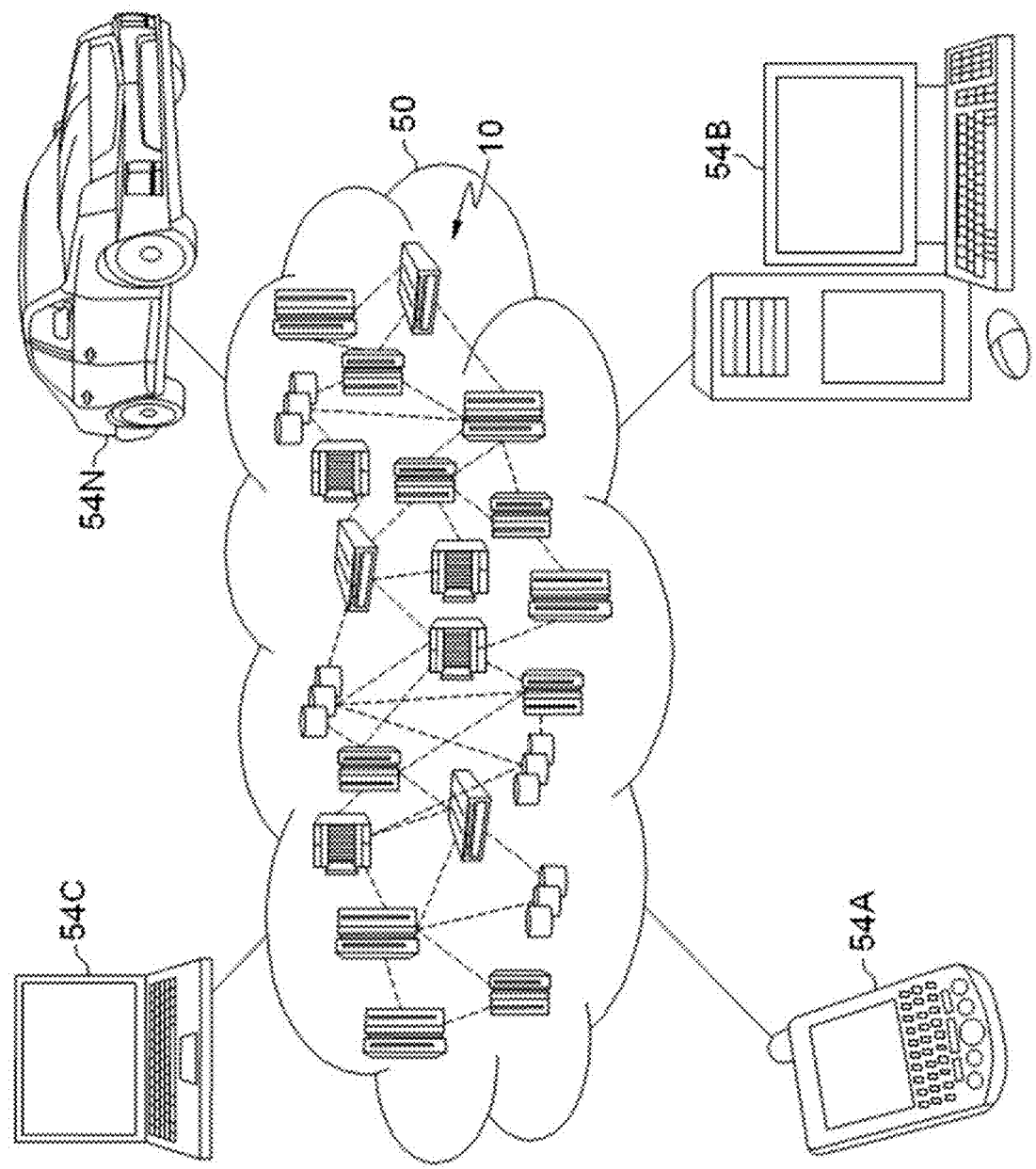
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
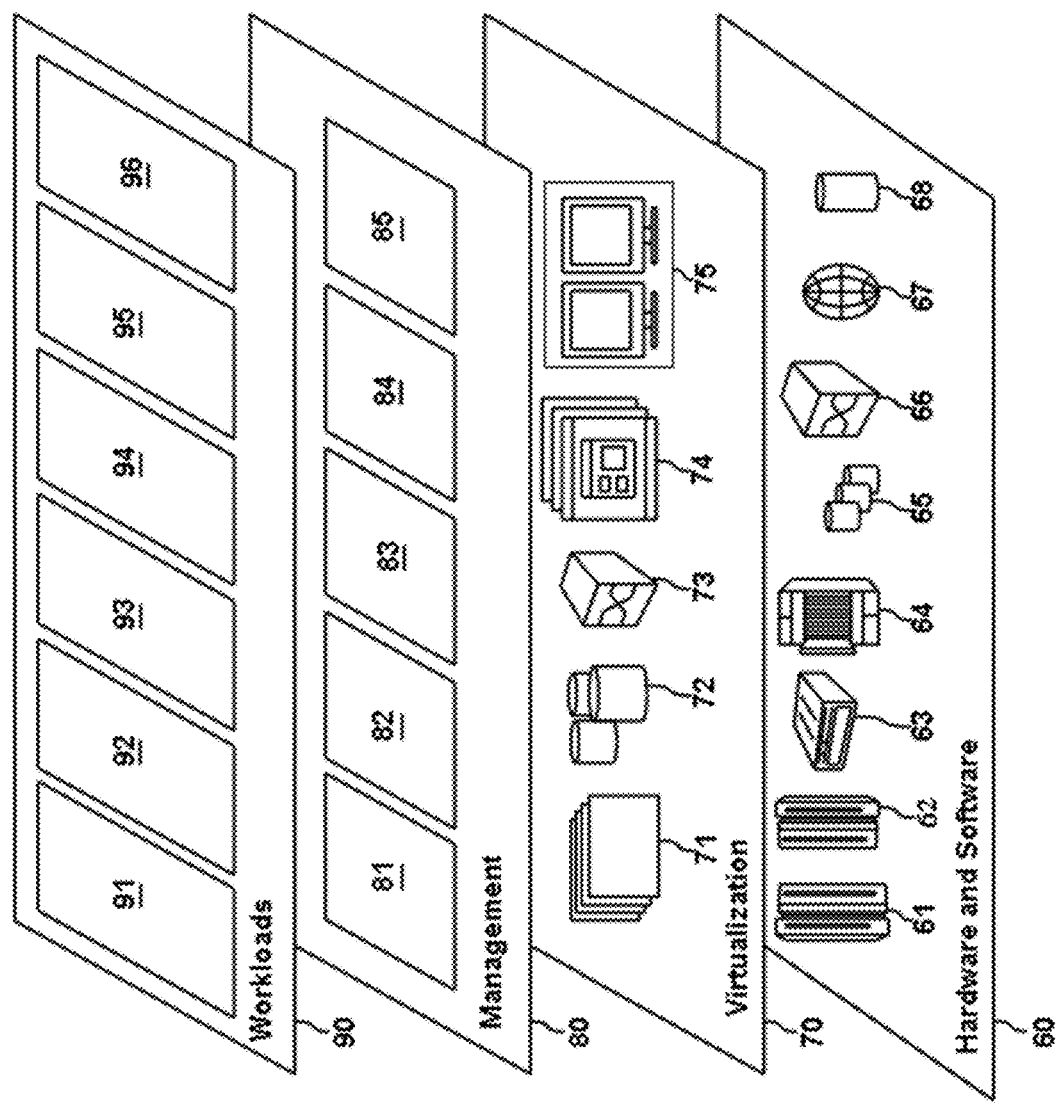
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data processing 96.

Figure 4:
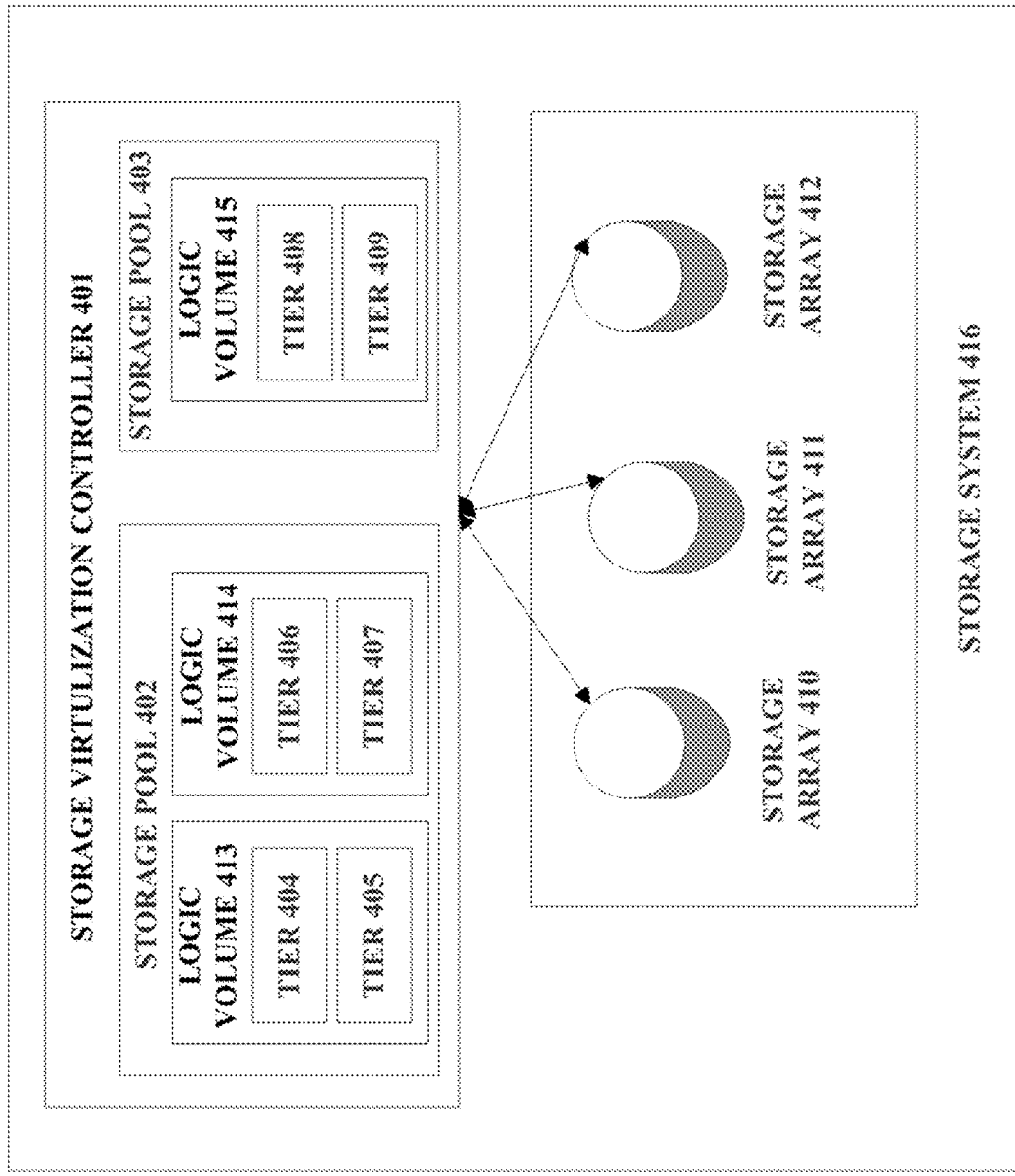
FIG. 4 depicts an exemplary MSS in which the present invention may be implemented according to one embodiment of the present invention.

FIG. 4 depicts multitier storage system (MSS) 400 in which the present disclosure can be implemented according to an embodiment. The MSS 400 may comprises storage virtualization controller (SVC) 401 coupled to at least one storage system 416. SVC 401 can implement tiering management of MSS 400. SVC 401 comprises Storage pools 402, 403, which can be accessed from user applications. Storage pools 402, 403 are created to comprise at least one logic volume. For example, Storage pool 402 comprises Logic volumes 413, 414, and Storage pool 403 comprises Logic volume 415. Each logic volume comprises at least one tier. For example, Logic volume 413 comprises tiers 404, 405, and Logic volume 414 comprises tiers 406, 407, and Logic volume 415 comprises tiers 408, 409. Tiers in the storage pools 402, 403 can be divided into different type according to the performance of storage resource that Logic volumes 413, 414 and 415 can manage. A higher-performance storage is placed higher than a lower-performance storage. For example, Tier 408 can be a higher-performance storage such as Flash tier and Tier 409 can be a lower-performance storage such as HDD tier. It can be understood by the skilled in the art, a Flash tier and a HDD tier herein are only exemplary but not exhausted. Tiers 408, 409 are virtualized from storage arrays 410, 411, and 412 in Storage system 416. Storage arrays 410, 411, and 412 belong to persistent storage resource such as flash memory, magnetic disks, and tapes, etc. When data migration occurs from one tier to another, the real data flow occurs between arrays or inside one array in Storage system 416.

During the data migration, a free physical space may be generated in the storage pool. Even there is no new data to be written into the storage pool, the free physical space of the storage pool cannot be used by other storage pool. So this may leads to low usage efficiency of physical space of the storage system. It is desired to improve the physical space utilization in the MSS.

Now the core idea of the present disclosure is illustrated. The present disclosure provides a mechanism to release the free physical space of the storage pool to the storage array in time. As known, there are two written operations which can change the physical space of the storage pool, i.e., data written operations and data migration from one tier to another. After data migration from one tier to another, data migration from a source physical space to a destination physical space between storage arrays will be triggered. If the source physical space has been specified as thin provisioned, when no data will be written into logic volumes of the storage pool, the free physical space of the source physical space can be released to the storage array of the storage system for further utilization.

Figure 5:
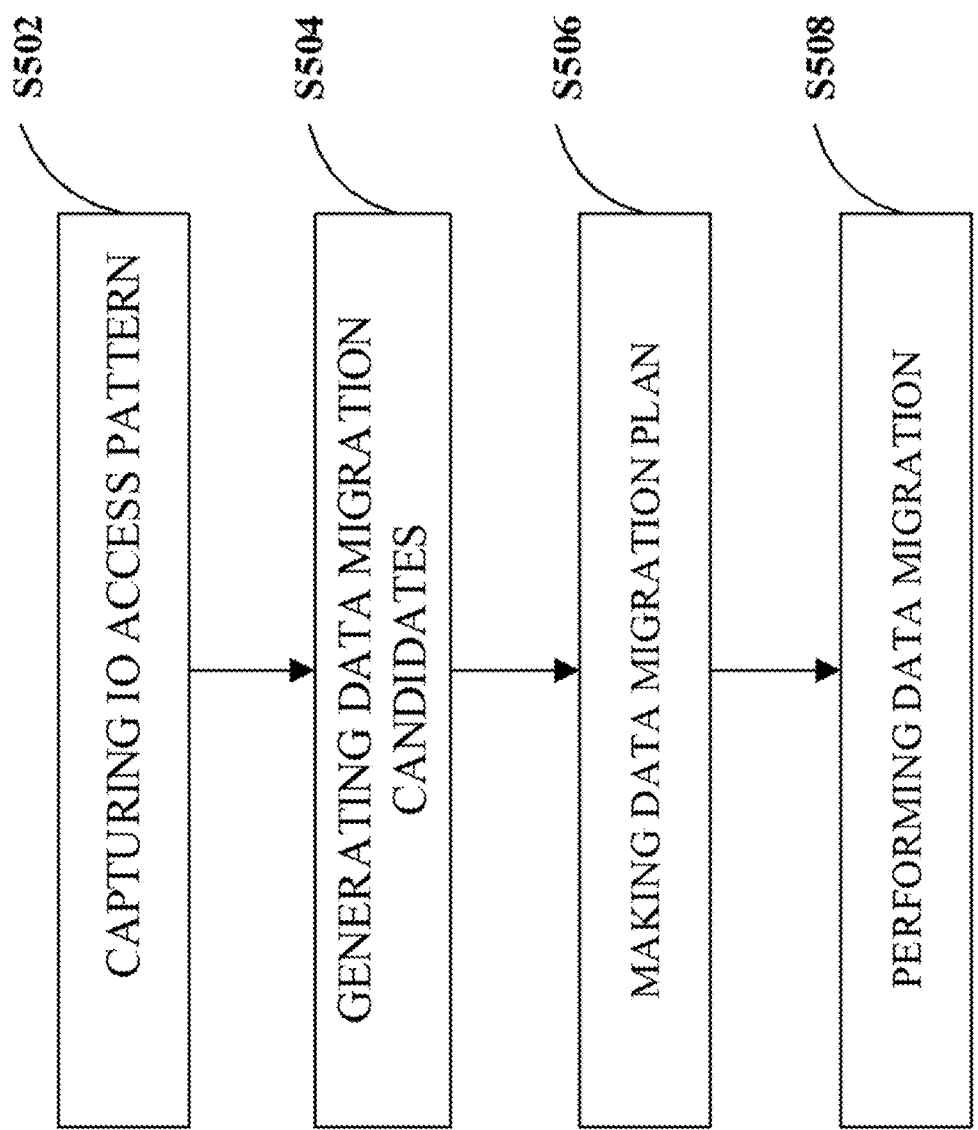
FIG. 5 depicts an exemplary workflow in a Storage Virtualization Controller according to an embodiment of the present invention.

FIG. 5 depicts an exemplary workflow 500 in SVC 401 according to an embodiment of the present invention. According to an embodiment of the present invention, SVC 401 may comprise an IO monitor, a data placement advisor, a data migration planner and a data migrator. In Step 502, the IO monitor can capture IO access pattern including read/ write IO Counts, latency, and Persistent bit etc. In Step 504, the data placement advisor can determine heat of data according to the IO access pattern, and then generate data migration candidates based on the heat of data. In Step 506, the data migration planner can perform analysis to determine a recommended data migration plan, and then monitor system performance to determine if the recommended data migration plan is effective. In Step 508, the data migrator can perform data migration based on the data migration plan.

Figure 6:
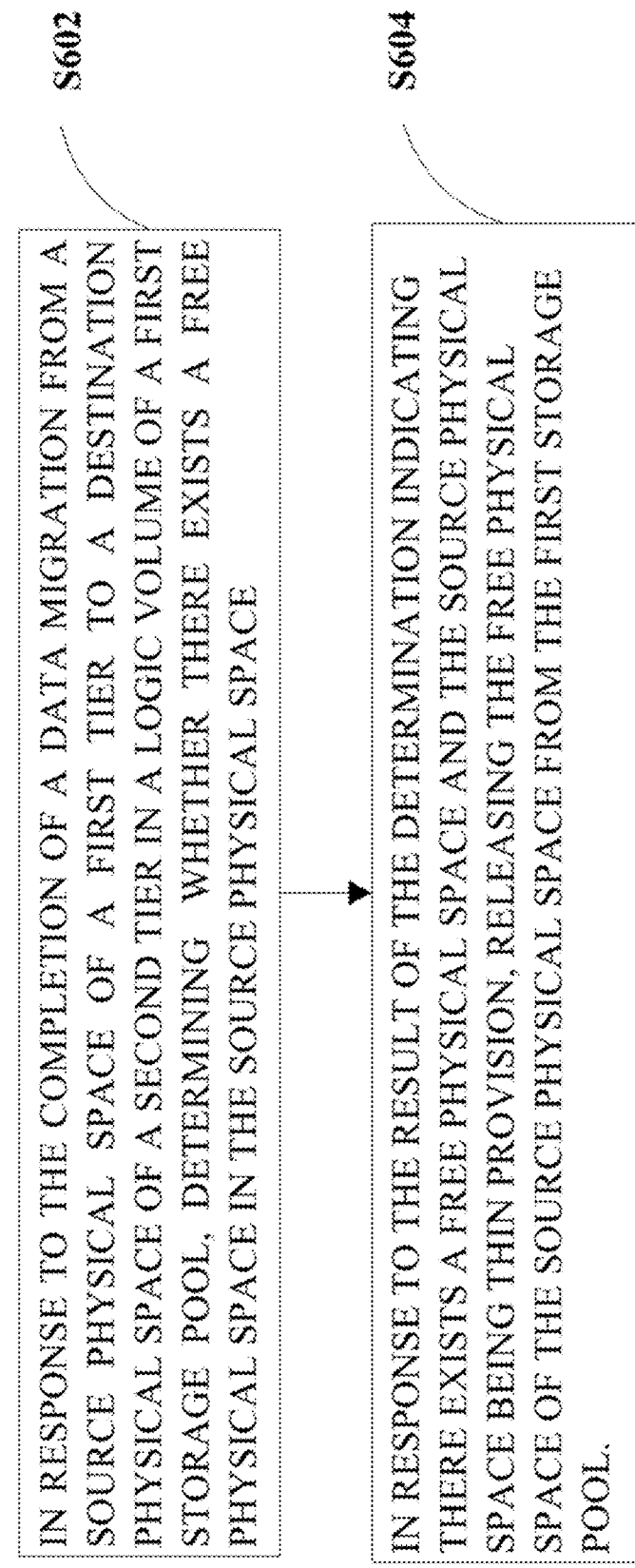
FIG. 6 depicts an exemplary data management method in a MSS according to an embodiment of the present invention.

FIG. 6 depicts an exemplary data management method in a MSS according to an embodiment of the present invention. The MSS comprises a storage virtualization controller (SVC) having at least one storage pool, and the storage pool comprises at least one logic volume, and the at least one logic volume comprises at least one tier. According to this method, in Step 602, in response to the completion of a data migration from a source physical space of a first tier to a destination physical space of a second tier in a logic volume of a first storage pool, it is determined by the SVC that whether there exists a free physical space in the source physical space. In Step 604, in response to the result of the determination indicating there exists a free physical space and the source physical space being thin provisioned, the free physical space of the source physical space is released from the first storage pool by the SVC. It should be noted, according to one embodiment of present disclosure, a first tier and a second tier can be a different tier, for example, if data becomes less hot, it can be migrated from a source physical space of a Flash tier to a destination physical space of a HDD (Hard Disk Drive) tier. According to another embodiment of present disclosure, a first tier and a second tier can also be the same tier, for example, data migration can occur from a source physical space to a destination physical space inside one tier for achieving workload balance.

As known, there are two kinds of storage allocation for each physical space, such as Logical Unit Number (LUN), i.e., thick provisioning and thin provisioning. Each physical space can be specified to be either of storage allocation by a user who operates the storage system. Thick provisioning and thin provisioning may be read from a configuration file in the MSS by the SVC. The following are definitions of thick provisioning and thin provisioning:

Thick provisioning: in virtual storage, thick provisioning is a type of storage allocation in which the amount of storage capacity on a disk is pre-allocated on physical storage at the time the disk is created, which also means that the physical storage is unavailable for anything else, even if no data has been written to the disk. However, thick provisioning has the benefit of less latency because all storage is allocated at once when virtual machines are created.

Thin provisioning: contrasting with thick provisioning, thin provisioning allocates storage on an as-needed basis. Thin provisioning helps to avoid wasting physical capacity and can save businesses on up-front storage costs.

It is found that, in response to the completion of the data migration from a source physical space of one tier to a destination physical space of another tier in one logic volume of a storage pool, if the source physical space is thick provisioning, the physical space of the storage pool comprising the source physical space will be the same as that before data migration. However, if the source physical space is thin provisioning, the physical space of the storage pool comprising the source physical space would be increased. Even there is no new data to be written to the storage pool, the increased physical space cannot be used by other storage pool, which causes waste of the physical space. According to the data management method of present disclosure, once the source physical space is determined to be thin provisioning, the increased physical space will be released to the storage array for further utilization.

As known, even if there is a free physical space in thick provisioned physical space, the free physical space cannot be released from the storage pool comprising the free physical space as the amount of storage capacity is pre-allocated on the physical space at the time the physical space is created and the physical space is unavailable for other storage pool. According to an embodiment of the present invention, in response to result of the determination indicating there exists a free physical space and the source physical space being thick provisioned, it is determined by the SVC whether the free physical space of the source physical space exceeds a threshold, if the free physical space of the source physical space exceeds a threshold, for example greater than 70% the source physical space, a request is sent from the SVC to a user of the MSS. In response to receiving a confirmation from a user indicating the source physical space is to be changed from thick provisioned to thin provisioned, the source physical space is changed by the SVC from thick provisioned to thin provisioned. Then the free physical space of the source physical space is released from the first storage pool by the SVC. Therefore, the free physical space of the source physical space can be utilized by other storage pools and performance of the MSS would be improved.

According to an embodiment of the present invention, in response to the release of the free physical space of the source physical space from the first storage pool, the data migrator can notify the data migration planner there exists a new released free physical space in the storage array. Upon receiving the notification, the data migration planner can determine a migration plan based on the released free physical space. So the data migration planner can be aware of the free physical space of the storage system in real time.

According to an embodiment of the present invention, wherein the released free physical space is a Flash space, and the determination of the migration plan by the SVC based on the released free physical space further comprises: in response to a first data in a second storage pool being hot and no free flash space existing in the second pool for migrating the first data, the released Flash space is allocated to the second storage pool for migrating the first data by the SVC.

According to an embodiment of the present invention, wherein the released free physical space is a Hard Disk Drive (HDD) space, and the determination of the migration plan by the SVC based on the released free physical space further comprises: in response to a second data in a second storage pool being cold and no free HDD space existing in the second pool for migrating the second data, the released HDD space is allocated to the second storage pool for migrating the second data by the SVC.

According to an embodiment of the present invention, wherein the released free physical space is a Flash space, and the determination of the migration plan by the SVC based on the released free physical space further comprises: in response to a third data in a first Flash tier of a second storage pool requiring workload balance and no free Flash space existing in a second Flash tier, the released Flash space is allocated to the second Flash tier of the second storage pool for workload balance by the SVC.

According to an embodiment of the present invention, wherein the released free space is a HDD space, and the determination of the migration plan by the SVC based on the released free physical space further comprises: in response to a first data in a second storage pool being hot and no free flash space existing in the second pool for migrating the first data, allocating, by the SVC, the released Flash space to the second storage pool for migrating the first data.

Figure 7:
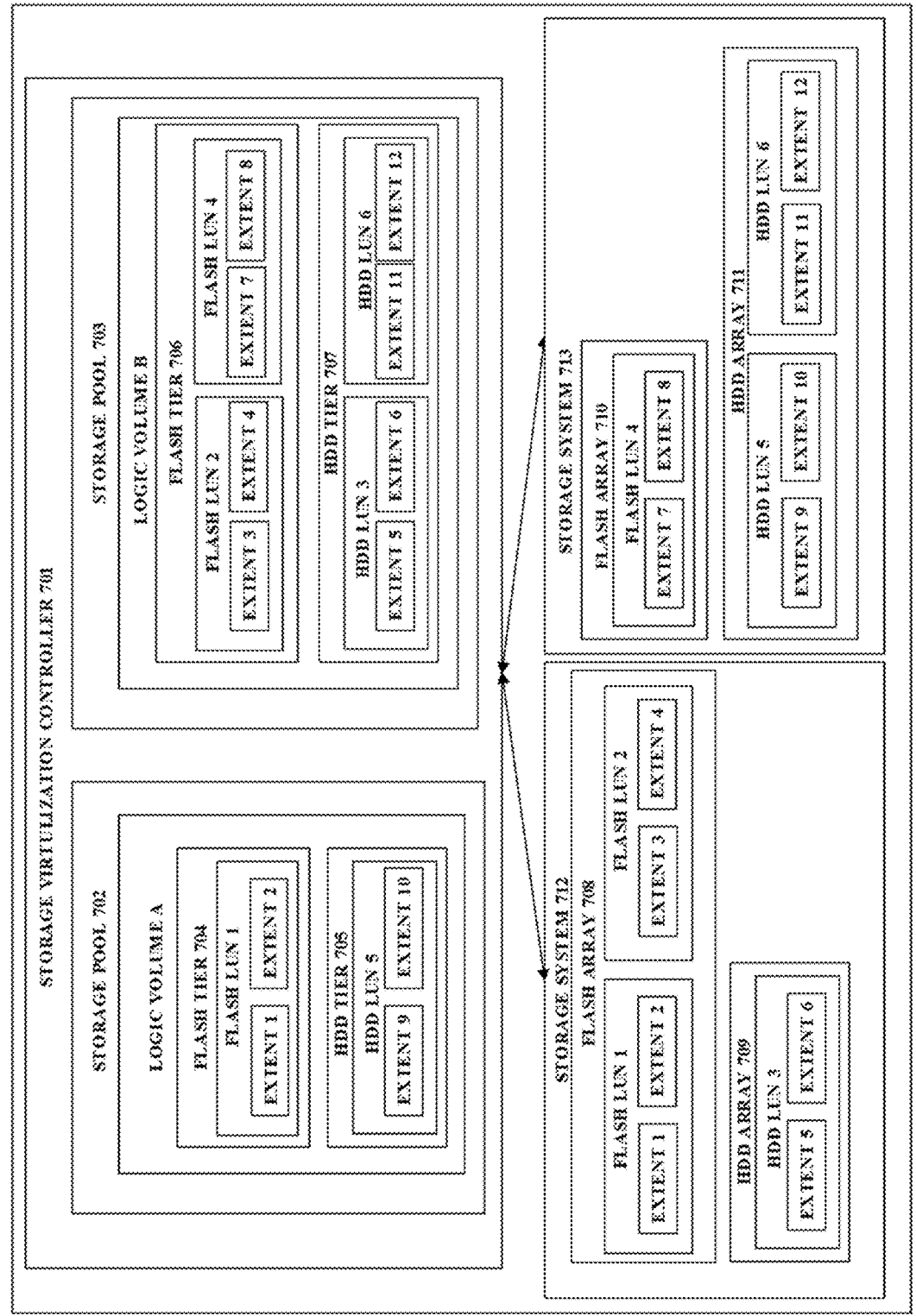
FIG. 7 depicts an exemplary data management in MSS 700 according to an embodiment of the present invention.

FIG. 7 depicts an exemplary data management in MSS 700 according to an embodiment of the present invention. SVC 701 comprises Storage pools 702 and 703, wherein Storage pool 702 comprises Logic volume A and Storage pool 703 comprises Logic volume B. Logic volume A comprises Flash tier 704 having Flash LUN 1 and HDD tier 705 having HDD LUN 5. Logic volume B comprises Flash tier 706 having Flash LUNs 2 and 4 and HDD tier 707 having HDD LUNs 3 and 6. Flash LUNs and HDD LUNs are comprised of a plurality of extents which are the granularity of data migration. Flash LUN 1 in Flash tier 704 and HDD LUN 5 in HDD tier 705 are mapped to Flash LUN 1 in Flash array 708 and HDD LUN 5 in HDD array 711 respectively. Flash LUN 2 and Flash LUN 4 in Flash tier 706 are mapped to Flash LUN 2 in Flash array 708 and Flash LUN 4 in Flash array 710 respectively. HDD LUN 3 and HDD LUN 6 in HDD tier 707 are mapped to Flash LUN 3 in HDD array 709 and HDD LUN 6 in HDD array 711 respectively.

Assuming Flash LUN 1 & HDD LUN 5 are both thin provisioned LUNs. Flash LUN 1 is allocated to a 20G flash space comprising 10G application data in Extent 1 and 10G application data in Extent 2. HDD LUN 5 is allocated to a 20G HDD space comprising 10G application data in Extent 9 and 10G application data in Extent 10. Flash LUN 2 is allocated to a 20G flash space comprising 10G application data in Extent 3 and 10G application data in Extent 4. Flash LUN 4 is allocated to a 20G flash space comprising 10G application data in Extent 7 and 10G application data in Extent 8. HDD LUN 3 is allocated to a 20G HDD space comprising 10G application data in Extent 5 and 10G application data in Extent 6. HDD LUN 6 is allocated to a 20G HDD space comprising 10G application data in Extent 11 and 10G application data in Extent 12.

Example 1

With reference now to FIG. 7, according to an embodiment of present disclosure, after one tiering cycle, the 10G application data in Extent 1 is identified by the data placement advisor as less hot, so the data migration planner decides to move the 10G application data from Extent 1 to HDD LUN 5. As HDD LUN 5 has no additional space for data migration, HDD LUN 5 is allocated an additional 10G HDD space from the storage array. So 10G application data in Extent 1 is moved to new allocated 10G HDD space in HDD LUN 5. After the completion of the data migration, Flash LUN 1 has 10G free Flash space. Although the total physical space of Storage pool 702 is increased to 50G, 10G free Flash space cannot be used unless there is data to be written into Logic volume A of Storage pool 702.

According to an embodiment of the present invention, in response to the completion of data migration from Extent 1 in Flash tier 704 to HDD tier 705, the data migrator may determine whether there exists a free Flash space in Flash LUN 1. Upon existing a free 10G Flash space in Flash LUN 1 and Flash LUN 1 being thin provisioning, the free 10G Flash space in Extent 1 is released from Storage pool 702.

According to an embodiment of the present invention, in response to the release of 10G Flash space in Extent 1 to Storage system 712, the data migrator may notify the data migration planner there exists a new released 10G Flash space in Storage system 712. At this time, the data migration planner acquires that 10G application data in Extent 5 is identified by data placement advisor as hot, while there is no additional Flash space in storage pool 703 for data migration. So the data migration planner requests Storage system 712 to allocate 10G Flash space to Storage pool 703. Then Flash LUN 2 is allocated 10G Flash space from Storage system 712. The data migration planner instructs the data migrator to move 10G application data in Extent 5 to the new allocated 10G Flash space in Flash LUN 2. Finally, the data migration task is finished.

Example 2

According to an embodiment of the present invention, after one tiering cycle, the data migration planner is aware that 10G application data in Extent 5 in HDD tier 707 needs data migration from HDD LUN 3 to HDD LUN 6 for workload balance. For HDD LUN 6 has no additional space for data migration, HDD LUN 6 is allocated an additional 10G HDD space from the storage array. So 10G application data in Extent 5 in HDD tier 707 is moved to the new allocated 10G HDD space in HDD LUN 6. After the data migration, HDD LUN 5 has a 10G free HDD space. Although the total physical space of Storage pool 703 has been increased to 50G, the 10G free HDD space cannot be used unless there is data to be written into volume B of Storage pool 703.

According to an embodiment of the present invention, in response to the completion of the data migration from Extent 5 in HDD LUN 3 to the new allocated 10G HDD space in HDD LUN 6 within HDD tier 707, the data migrator may determine whether there exists a free HDD space in HDD LUN 3. Upon existing a 10G free HDD space in HDD LUN 3 and HDD LUN 3 being thin provisioning, the 10G free HDD space in Extent 5 is released from Storage pool 703.

According to an embodiment of the present invention, upon the release of the 10G HDD space in Extent 5 from Storage pool 703, the data migrator may notify the data migration planner there exists a new released 10G HDD space in Storage system 712. At this time, the data migration planner acquires that 10G application data in Extent 2 in Flash LUN 1 is identified by data placement advisor as less hot, while there is no additional HDD space in Storage pool 702 for data migration. So the data migration planner requests Storage system 712 to allocate a 10G HDD space to Storage pool 702. Then HDD LUN 5 is allocated with a 10G HDD space from Storage system 712. The data migration planner instructs the data migrator to move 10G application data in Extent 2 to the new allocated 10G HDD space in HDD LUN 5. Finally, the data migration task is finished.

Example 3

With reference now to FIG. 7, according to an embodiment of present disclosure, after one tiering cycle, the 10G application data in Extent 2 is identified by data placement advisor as less hot, so data migration planner decides to move the 10G application data from Extent 2 to HDD LUN 5. For HDD LUN 5 has no additional space for data migration, HDD LUN 5 is allocated with an additional 10G HDD space from Storage array. So 10G application data in Extent 2 is moved to the new allocated 10G HDD space in HDD LUN 5. After the completion of the data migration, Flash LUN 1 has a 10G free Flash space. Although the total physical space of Storage pool 702 is increased to 50G, the 10G free Flash space cannot be used unless there is data to be written into Logic volume A of Storage pool 702.

According to an embodiment of the present invention, in response to the completion of the data migration from Extent 2 in Flash tier 704 to HDD tier 705, the data migrator may determine whether there exists a free physical space in Flash LUN 1. Upon existing a 10G free Flash space in Flash LUN 1 and Flash LUN 1 being thin provisioning, the 10G free Flash space in Extent 2 is released from Storage pool 702.

According to an embodiment of the present invention, upon the release of the free 10G Flash space in Extent 2 from Storage pool 702, the data migrator may notify the data migration planner there exists a new released 10G Flash space in Storage system 712. At this time, the data migration planner acquires that 10G application data in Extent 3 in Flash tier 706 needs data migration from Flash LUN 2 to Flash LUN 4 for workload balance, while there is no additional Flash space in Flash LUN 4 for data migration. So the data migration planner requests Storage system 712 to allocate a 10G Flash space to Storage pool 703. Then Flash LUN 4 is allocated with a 10G Flash space by Storage system 712. Then the data migration planner instructs the data migrator to move 10G application data in Extent 3 in Flash LUN 2 to the new allocated 10G HDD space in Flash LUN 4. Finally, the workload balance between Flash LUN 2 and Flash LUN 4 is finished.

Example 4

According to an embodiment of the present invention, after one tiering cycle, the 10G application data in Extent 10 is identified by the data placement advisor as hot, so the data migration planner decides to move the 10G application data from Extent 10 to Flash LUN 1. For Flash LUN 1 has no additional Flash space for data migration, Flash LUN 1 is allocated with an additional 10G Flash space from the storage array. So 10G application data in Extent 10 is moved to the new allocated 10G Flash space in Flash LUN 1. After the data migration, HDD LUN 5 has a 10G free HDD space. Although the total physical space of Storage pool 702 has been increased to 50G, the 10G free HDD space in Extent 10 cannot be used unless there is data to be written into Logic volume A of Storage pool 702.

According to an embodiment of the present invention, in response to the completion of the data migration from Extent 10 in HDD tier 705 to Flash tier 704, the data migrator may determine whether there exists a free physical space in HDD LUN 5. Upon existing a 10G free HDD space in HDD LUN 5 and HDD LUN 5 being thin provisioning, the 10G free Flash space in Extent 10 is released from Storage pool 702.

According to an embodiment of the present invention, in response to the release of the 10G HDD space in Extent 10 from Storage pool 702, the data migrator may notify the data migration planner there exists a new released 10G HDD space in the storage system 713. At this time, the data migration planner acquires that 10G application data in Extent 5 in HDD tier 707 needs data migration from HDD LUN 5 to HDD LUN 6 for workload balance, while there is no additional HDD space in HDD LUN 6 for data migration. So the data migration planner requests Storage system 713 to allocate a 10G HDD space to Storage pool 703. Then HDD LUN 6 is allocated with 10G HDD space from Storage system 713. The data migration planner instructs the data migrator to move 10G application data in Extent 5 to the new allocated 10G HDD space in HDD LUN 6. Finally, the workload balance between HDD LUN 5 and HDD LUN 6 is finished.

As cited above, it can be understood by the person in the art that: Flash tier & HDD tier and Flash space & HDD space in above examples 1-4 are only exemplary but not intended to suggest any limitation as to the scope of present disclosure. Any known or future emerging tier and physical space are within the scope of present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data management in a multitier storage system (MSS), the MSS comprising a storage virtualization controller (SVC) having at least one storage pool, the at least one storage pool comprising at least one logic volume, the at least one logic volume comprising at least one tier, the method comprising:
    determining, by the SVC, whether there is a free physical space in a source physical space in response to a completion of a data migration from the source physical space of a first tier to a destination physical space of a second tier in a logic volume of a first storage pool;
    releasing, by the SVC, the free physical space of the source physical space from the first storage pool in response to a result of a determination indicating the free physical space and the source physical space are thin provisioned;
    determining, by the SVC, whether the free physical space of the source physical space exceeds a threshold in response to result of the determination indicating there is the free physical space and the source physical space are thick provisioned;
    sending, by the SVC, a request to a user of the MSS in response to the free physical space of the source physical space exceeding the threshold;
    changing, by the SVC, the source physical space from thick provisioned to thin provisioned in response to receiving a confirmation from the user indicating the source physical space is to be changed from thick provisioned to thin provisioned; and
    releasing, by the SVC, the free physical space of the source physical space from the first storage pool.

2. The method of claim 1, further comprising:
    determining, by the SVC, a migration plan based on the released free physical space in response to the release of the free physical space of the source physical space.

3. The method of claim 2, wherein the released free physical space is a Flash space, and the determination of the migration plan by the SVC based on the released free physical space further comprises:
    allocating, by the SVC, the released Flash space to a second storage pool for migrating the first data in response to a first data in the second storage pool being hot and no free flash space existing in the second pool for migrating the first data.

4. The method of claim 2, wherein the released free physical space is a Hard Disk Drive (HDD) space, and the determination of the migration plan by the SVC based on the released free physical space further comprises:
    allocating by the SVC the released HDD space to the second storage pool for migrating the second data in response to the second data in the second storage pool being cold and no free HDD space existing in the second pool for migrating the second data.

5. The method of claim 2, wherein the released free physical space is a Flash space, and the determination of the migration plan by the SVC based on the released free physical space further comprises:

allocating, by the SVC, the released Flash space to a second Flash tier of the second storage pool for workload balance in response to a third data in a first Flash tier of a second storage pool requiring workload balance and no free Flash space existing in the second Flash tier.

6. The method of claim 2, wherein the released free space is a HDD space, and the determination of the migration plan by the SVC based on the released free physical space further comprises:

allocating, by the SVC, the released HDD space to the second HDD tier of the second storage pool for workload balance in response to a fourth data in a first HDD tier of a second storage pool requiring workload balance and no free HDD space existing in the second HDD tier.

7. A system for data management in a multitier storage system (MSS), the MSS comprising a storage virtualization controller (SVC) having at least one storage pool, the at least one storage pool comprising at least one logic volume, the at least one logic volume comprising at least one tier, the system comprising a computer processor coupled to a computer-readable memory unit, the memory unit comprising instructions that when executed by the computer processor implements a method comprising:

determining, by the SVC, whether there is a free physical space in a source physical space in response to a completion of a data migration from the source physical space of a first tier to a destination physical space of a second tier in a logic volume of a first storage pool;

releasing, by the SVC, the free physical space of the source physical space from the first storage pool in response to a result of a determination indicating the free physical space and the source physical space are thin provisioned;

determining, by the SVC, whether the free physical space of the source physical space exceeds a threshold in response to result of the determination indicating there is the free physical space and the source physical space are thick provisioned;

sending, by the SVC, a request to a user of the MSS in response to the free physical space of the source physical space exceeding the threshold;

changing, by the SVC, the source physical space from thick provisioned to thin provisioned in response to receiving a confirmation from the user indicating the source physical space is to be changed from thick provisioned to thin provisioned; and releasing, by the SVC, the free physical space of the source physical space from the first storage pool.

8. The system of claim 7, wherein the method further comprises determining, by the SVC, a migration plan based on the released free physical space in response to the release of the free physical space of the source physical space.

9. The system of claim 8, wherein the released free physical space is a Flash space, and the determination of the migration plan based on the released free physical space further comprises:

allocating, by the SVC, the released Flash space to a second storage pool for migrating the first data in response to a first data in the second storage pool being hot and no free flash space existing in the second pool for migrating the first data.

10. The system of claim 8, wherein the released free physical space is a Hard Disk Drive (HDD) space, and the determination of the migration plan by the SVC based on the released free physical space further comprises:

allocating by the SVC the released HDD space to the second storage pool for migrating the second data in response to the second data in the second storage pool being cold and no free HDD space existing in the second pool for migrating the second data.

11. The system of claim 8, wherein the released free physical space is a Flash space, and the determination of the migration plan by the SVC based on the released free physical space further comprises:

allocating, by the SVC, the released Flash space to a second Flash tier of the second storage pool for workload balance in response to a third data in a first Flash tier of a second storage pool requiring workload balance and no free Flash space existing in the second Flash tier.

12. The system of claim 8, wherein the released free space is a HDD space, and the determination of the migration plan by the SVC based on the released free physical space further comprises:

allocating, by the SVC, the released HDD space to the second HDD tier of the second storage pool for workload balance in response to a fourth data in a first HDD tier of a second storage pool requiring workload balance and no free HDD space existing in the second HDD tier.

13. A computer program product for data management in a multitier storage system (MSS), the MSS comprising a storage virtualization controller (SVC) having at least one storage pool, the at least one storage pool comprising at least one logic volume, the at least one logic volume comprising at least one tier, the computer program product comprising a computer readable storage medium having program instructions embodied therewith, the program instructions executable by a device to cause the electronic device to perform a method comprising:

determining, by the SVC, whether there is a free physical space in a source physical space in response to a completion of a data migration from the source physical space of a first tier to a destination physical space of a second tier in a logic volume of a first storage pool;

releasing, by the SVC, the free physical space of the source physical space from the first storage pool in response to a result of a determination indicating the free physical space and the source physical space are thin provisioned;

determining, by the SVC, whether the free physical space of the source physical space exceeds a threshold in response to result of the determination indicating there is the free physical space and the source physical space are thick provisioned;

sending, by the SVC, a request to a user of the MSS in response to the free physical space of the source physical space exceeding the threshold;

changing, by the SVC, the source physical space from thick provisioned to thin provisioned in response to receiving a confirmation from the user indicating the source physical space is to be changed from thick provisioned to thin provisioned; and releasing, by the SVC, the free physical space of the source physical space from the first storage pool.

14. The computer program product of claim 13, wherein the method further comprises:
   determining, by the SVC, a migration plan based on the released free physical space in response to the release of the free physical space of the source physical space.

15. The computer program product of claim 14, wherein the released free physical space is a Flash space, and the determination of the migration plan by the SVC based on the released free physical space further comprises:
   allocating, by the SVC, the released Flash space to a second storage pool for migrating the first data in response to a first data in the second storage pool being hot and no free flash space existing in the second pool for migrating the first data.

16. The computer program product of claim 14, wherein the released free physical space is a Hard Disk Drive (HDD) space, and the determination of the migration plan by the SVC based on the released free physical space further comprises:
   allocating by the SVC the released HDD space to the second storage pool for migrating the second data in response to the second data in the second storage pool being cold and no free HDD space existing in the second pool for migrating the second data.

17. The computer program product of claim 14, wherein the released free physical space is a Flash space, and the determination of the migration plan by the SVC based on the released free physical space further comprises:
   allocating, by the SVC, the released Flash space to a second Flash tier of the second storage pool for workload balance in response to a third data in a first Flash tier of a second storage pool requiring workload balance and no free Flash space existing in the second Flash tier.

18. The computer program product of claim 14, wherein the released free space is a HDD space, and the determination of the migration plan by the SVC based on the released free physical space further comprises:
   allocating, by the SVC, the released HDD space to the second HDD tier of the second storage pool for workload balance in response to a fourth data in a first HDD tier of a second storage pool requiring workload balance and no free HDD space existing in the second HDD tier.

* * * * *